United States Patent [19]

Nini

[11] Patent Number: 5,172,882

[45] Date of Patent: Dec. 22, 1992

[54] MANUAL SEAT ADJUSTER WITH DUAL LOCKING MEANS

[75] Inventor: James P. Nini, Mt. Clemens, Mich.

[73] Assignee: General Motors Corporation, Detroit, Mich.

[21] Appl. No.: 674,474

[22] Filed: Mar. 25, 1991

[51] Int. Cl.⁵ .......................................... F16M 13/00
[52] U.S. Cl. .................................. 248/430; 297/311; 297/473
[58] Field of Search ............... 248/419, 420, 429, 430; 297/311, 344, 473

[56] References Cited

U.S. PATENT DOCUMENTS

| | | | |
|---|---|---|---|
| 3,727,977 | 4/1973 | Gmeiner | 297/344 |
| 3,940,182 | 2/1976 | Tamura | 297/341 |
| 4,204,658 | 4/1980 | Courtois | 248/430 |
| 4,281,871 | 8/1981 | Grittner et al. | 248/429 X |
| 4,478,383 | 10/1984 | Urai | 248/429 |
| 4,563,044 | 1/1986 | Rees | 308/3.8 |
| 4,580,755 | 4/1986 | Rees | 248/430 |
| 4,648,657 | 3/1987 | Cox et al. | 297/341 |
| 4,676,555 | 6/1987 | Tokugawa | 297/473 |
| 4,729,602 | 3/1988 | Tokugawa | 297/473 X |
| 4,733,845 | 3/1988 | Maiwald | 248/429 |
| 4,804,229 | 2/1989 | Nishino | 297/473 X |
| 4,832,409 | 5/1989 | Borlinghaus et al. | 297/473 X |
| 4,881,827 | 3/1988 | Borlinghaus et al. | 384/47 |

FOREIGN PATENT DOCUMENTS

| | | | |
|---|---|---|---|
| 2700474 | 7/1978 | Fed. Rep. of Germany | 248/429 |
| 829449 | 3/1960 | United Kingdom | 248/429 |

*Primary Examiner*—David L. Talbott
*Attorney, Agent, or Firm*—Edward J. Biskup

[57] ABSTRACT

An improved manual seat adjuster for selectively positioning a seat which requires as little space as possible to operate and that includes a primary and secondary locking arrangement for resisting greater than normal loading which may be experienced by the seat adjuster.

13 Claims, 3 Drawing Sheets

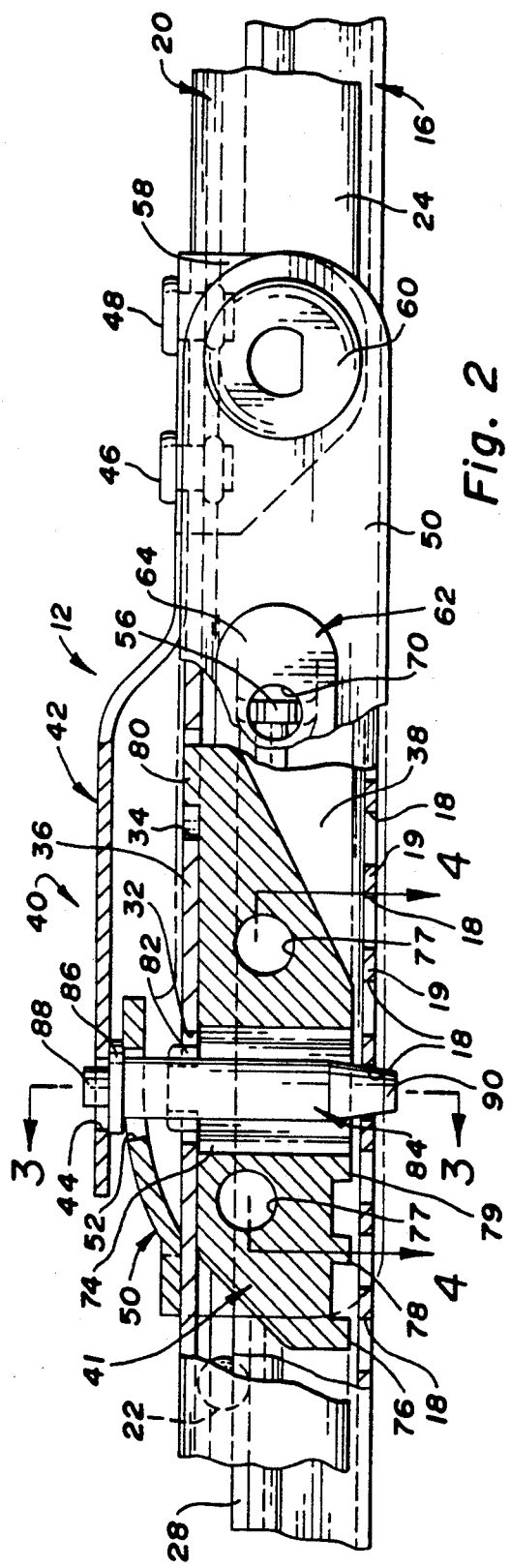
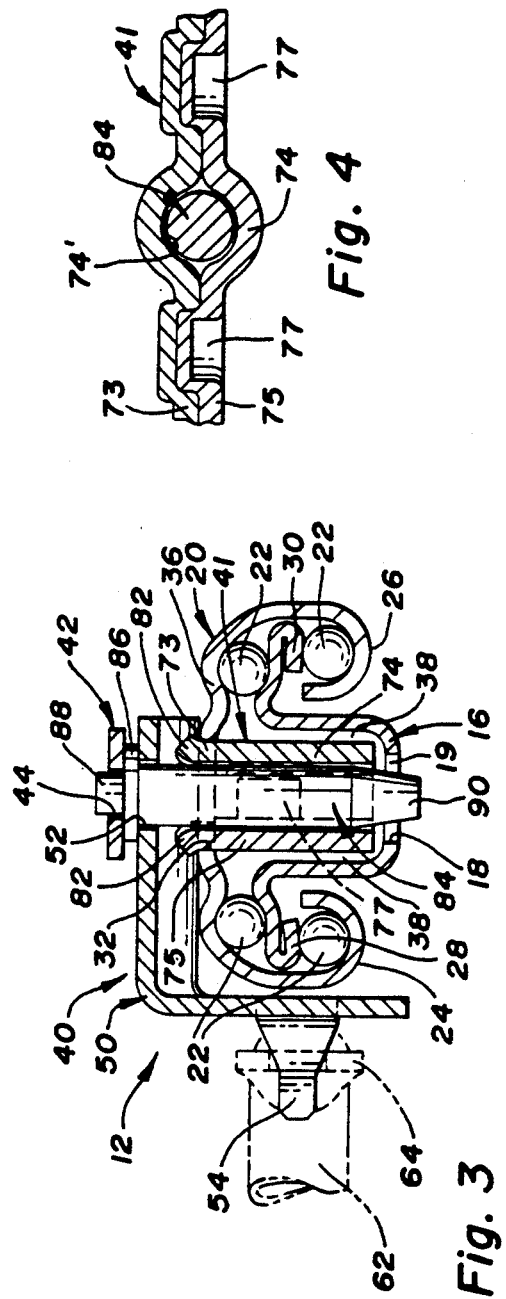

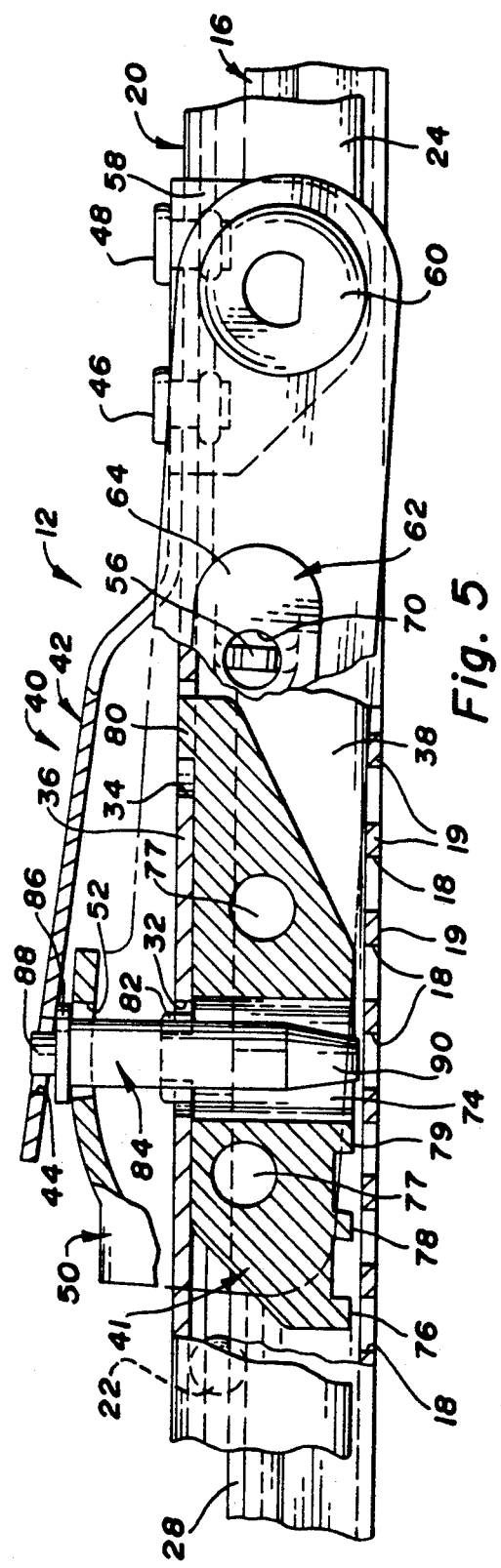

MANUAL SEAT ADJUSTER WITH DUAL LOCKING MEANS

BACKGROUND OF THE INVENTION

This invention relates generally to vehicle seat adjusters and more specifically to vehicle manual seat adjusters which are adjustable fore and aft and which include a latching mechanism for maintaining a seat in a desired adjusted position.

Manual seat adjusters for a vehicle are well known in the art. A typical manually adjusted seat assembly will have two generally parallel seat adjusters each comprising a lower channel, sometimes referred to as a floor channel, connected to the vehicle. An upper channel with a seat attached is slidably carried by the lower channel and the lower channel and the upper channel are interconnected to prevent separation of the channels. Some form of latching mechanism is usually included to selectively adjust the position of the upper channel relative to the lower channel and thereby selectively position the seat relative to the vehicle.

A typical manual seat adjuster is designed to normally withstand the vertically directed loads placed upon it by an occupant of the seat. But when a seat belt is attached to the seat adjuster, a sudden deceleration can cause the seat adjuster to experience a larger than normal force in a horizontal direction. Nonetheless, it is desirable to attach a seat belt to the seat adjuster so that when the position of the seat is adjusted the seat belt will still be comfortable and secure and will not have to be readjusted. As a result, if a seat belt is attached to the manual seat adjuster, the seat adjuster must be able to withstand the greater than normal horizontal and vertical loads placed upon it by the seat belt during the sudden deceleration situations.

It is also desirable to have a manual seat adjuster which requires as little space and weight as possible to operate. Size and weight requirements are very important to automobile manufacturers in the present times. The smaller and lighter one can make a component of an automobile while still providing as good, or even improved, strength characteristics, the better. Therefor, a system to increase the strength of the manual seat adjuster without adding to the space required by the manual seat adjuster is needed.

SUMMARY OF THE INVENTION

An object of the present invention is to provide a new and improved manual seat adjuster for selectively positioning a seat and that has a latching mechanism having primary and secondary locking means for increasing the seat adjuster's ability to withstand loads in a horizontal direction placed upon it by a seat belt during sudden deceleration situations.

Another object of the present invention is to provide a new and improved manual seat adjuster for selectively positioning a seat which requires as little space as possible to operate and that includes a primary and secondary locking arrangement for resisting greater than normal loading which may be experienced by the seat adjuster.

Yet another object of the present invention is to provide a new and improved manual seat adjuster for selectively positioning a seat which reduces the space needed to operate and that includes a supplementary locking device incorporated in with the latching mechanism of the seat adjuster to allow the latter to withstand increased loads placed upon it by a seat belt during sudden deceleration situations.

Still another object of the present invention is to provide a new and improved manual seat adjuster having a latching mechanism for selectively positioning a seat and that includes a supplemental locking means which together with the primary locking means of the latching mechanism serves to secure an upper channel in position relative to a lower channel of the manual seat adjuster when the seat encounters high load situations.

The present invention meets the above mentioned objects by providing a seat assembly which has two similar parallel manual seat adjusters. Each of the manual seat adjusters comprise a lower channel which is fixedly mounted to a floor of the vehicle and an upper channel which is carried by the lower channel by a ball bearing assembly. The upper channel is interconnected with the lower channel to prevent the channels from being separated by a vertical force. The upper channel has a round pin hole and an oblong positioning hole formed in the top surface of the upper channel while the lower channel has evenly longitudinally spaced oblong slots formed in the bottom surface of the lower channel. A latching mechanism is carried by the upper channel and includes a vertically movable lock pin that cooperates with the oblong slots in the lower channel to provide a primary locking means for locking the upper channel to the lower channel during seat adjustment. More specifically, the latching mechanism includes a spring clip provided with a locator pin slot that is fixedly attached to the top surface of the upper channel. An actuator member provided with an oblong locator hole is pivotally attached to a side flange of the spring clip and a manually operated lift bar is attached to the actuator member. The lower channel and the upper channel define an interior space in which a sleeve member that serves as a guide for the lock pin and as a secondary locking device is located. The sleeve member has its upper portion fixed to the upper channel and has a set of lock tabs at its forward end and a positioning tab at its rearward end. In the preferred form, the lock pin has its upper end supported by the locator slot of the spring clip and is provided with an annular flange. The lock pin extends freely through the locator hole in the actuator member and is formed at its lower end with a conical tip adapted to move into one of the slots in the lower channel for locking the upper and lower channels together. When the seat adjuster is in the latched position, the conical tip of the lock pin is located in one of the slots of the lower channel and is maintained therein by the spring clip. When the lift bar is raised, the actuator member engages the annular flange of the lock pin against the bias of the spring clip to remove the lock pin from engagement with the accommodating slot of the lower channel so that the seat may be repositioned by the occupant of the seat. When the seat adjuster is subjected to an abnormally large forwardly directed horizontal force, the upper channel will cause the lock pin to tilt forwardly and similarly cause the sleeve member to tilt in the same direction so as to allow the lock tabs thereof to engage the slots of the lower channel and thereby help maintain the seat in a fixed position.

Other objects and features of the invention will become apparent to those skilled in the art as disclosure is made in the following detailed description of a preferred embodiment of the invention which sets forth the best mode of the invention contemplated by the inventor and which is illustrated in the accompanying sheets of drawing.

BRIEF DESCRIPTION OF THE DRAWINGS

FIG. 2 is an enlarged partially sectioned side view of one of the manual seat adjusters seen in FIG. 1 and taken along line 2—2 thereof showing the lock pin of the latching mechanism in a latched position;

FIG. 3 is a sectional view of the manual seat adjuster taken along line 3—3 of FIG. 2;

FIG. 4 is a sectional view of the guide sleeve member for the lock pin taken along line 4—4 of FIG. 2;

FIG. 5 is a view of the manual seat adjuster similar to that in FIG. 2 and showing the lock pin of the latching mechanism in the unlatched position; and FIG. 6 is a view similar to that shown in FIG. 2 but shows the position assumed by the lock pin and the guide sleeve member when the seat encounters high load situations.

DETAILED DESCRIPTION OF THE PREFERRED EMBODIMENT

Figure 1:
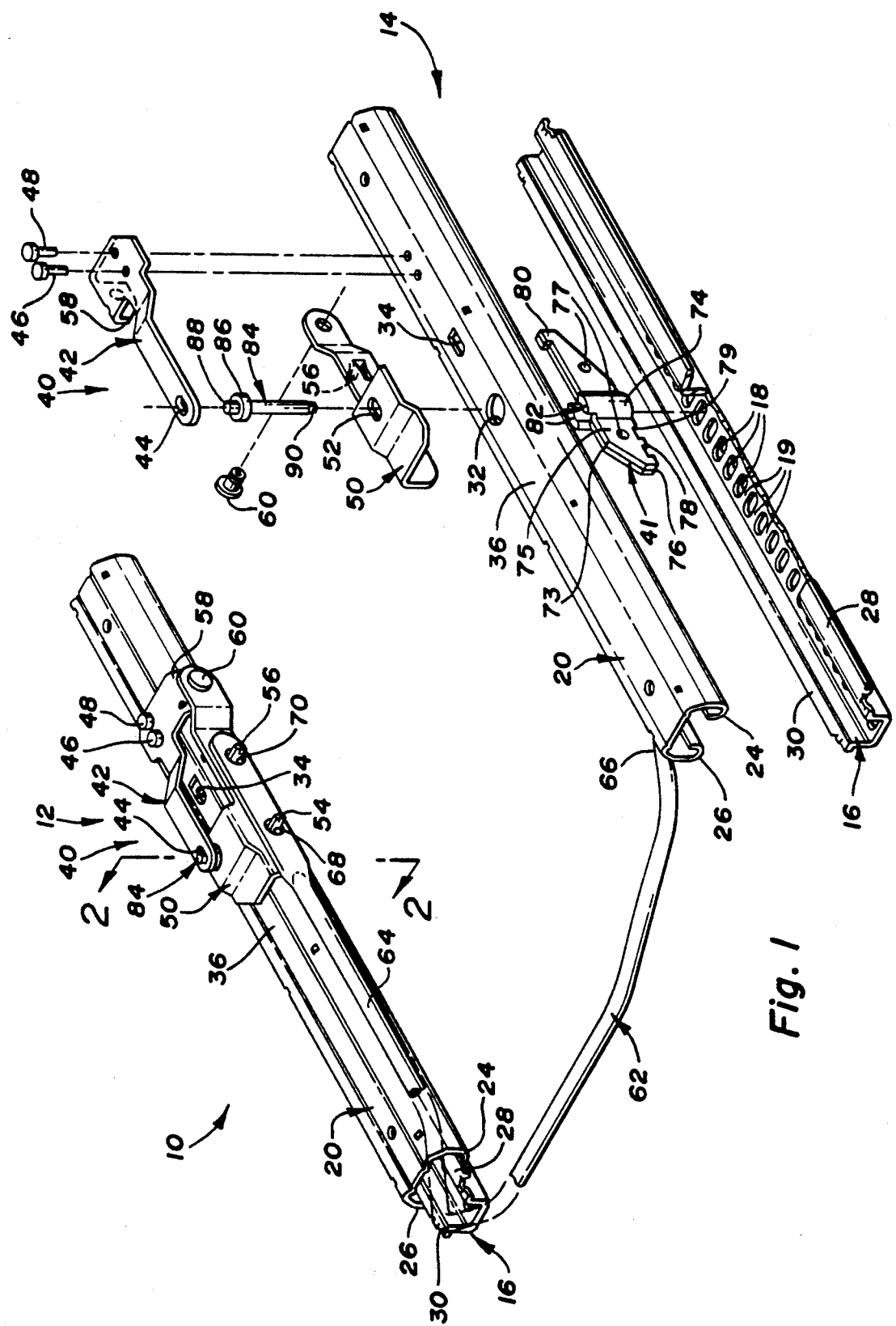
FIG. 1 is a perspective view of a pair of manual seat adjusters each incorporating a latching mechanism having dual locking means in accordance with the present invention and with one of the seat adjusters shown in exploded perspective view.

Referring now to the drawings, a seat assembly 10 adapted to carry a seat (not shown) of a motor vehicle is shown in FIG. 1. The seat assembly 10 comprises a pair of parallel manual seat adjusters 12 and 14, which are mirror images of each other. Each of the manual seat adjusters 12 and 14 comprise a lower channel 16 which is fixedly mounted to a floor (not shown) of the vehicle by a pair of mounting brackets (not shown). The lower channel 16 has a plurality of evenly and longitudinally spaced oblong slots 18 formed therein separated by a plurality of webbing 19 along a bottom surface of the lower channel 16. An upper channel 20 to which the seat and a seat belt system are normally attached is carried by the lower channel 16 by vertically spaced ball bearing assemblies 22, as shown in FIG. 3. The upper channel 20 has curved flanges 24 and 26 which are interconnected through the ball bearing assemblies 22 with projecting flanges 28 and 30, respectively, of the lower channel 16 to prevent the channels 16 and 20 from being separated by a vertical force. The lower channel 16 and the upper channel 20 together define an interior space 38 between the two channels 16 and 20. As shown in FIG. 1 the upper channel 20 has a round hole 32 and an oblong positioning hole 34 formed in a top surface 36 of the upper channel 20.

As seen in FIGS. 1 and 2, each of the manual seat adjusters 12 and 14 include a latching mechanism, made in accordance with the present invention, having a primary locking means for maintaining the associated seat adjuster in a latched position and also a secondary locking means in the form of a sleeve member 41 activated by the primary locking means when the seat adjuster is experiencing abnormally large horizontal forces as will be more fully explained hereinafter.

More specifically, the latching mechanism 40 includes a spring clip 42 formed with a locator slot 44 that is fixedly attached to the top surface 36 of the upper channel 20 by a pair of rivets 46 and 48. An actuator member 50 is formed with an oblong locator hole 52 and a pair of laterally outwardly extending tabs 54 and 56 and is pivotally attached at its rear end to a side flange 58 of the spring clip 42 by a rivet 60. A generally U-shaped hand-operated lift bar 62 has a pair of arms 64 and 66 each of which define a pair of mounting holes 68 and 70 on each arm that mate with the tabs 54 and 56 of the associated actuator member 50. The lift bar 62 is held in place by a biasing action of each of the arms 64 and 66 pushing against the actuator member 50 of the seat adjusters 12 and 14.

As seen in FIG. 4, the sleeve member 41 is composed of a pair of high strength metal strips 73 and 75 locked together and located in the interior space 38 between the lower channel 16 and the upper channel 20. To lock the metal strips 73 and 75 together, the strips 73 and 75 are stamp pressed together with a pair of circular depressions 77, and the resulting deformation of the strips 73 and 75 locks them together to form the sleeve member 41. The mid-section of the sleeve member 41 is provided with a tubular portion 74 which defines a generally cylindrical opening 74' and the forward lower end of the sleeve member 41 is provided with a set of lock tabs 76, 78 and 79 while the rear upper end thereof has a positioning tab 80. The upper end of tubular portion 74 has a pair of laterally spaced flanges 82 which extend through the hole 32 of the upper channel 20 and which are peened over to fixedly hold the upper portion of sleeve member 41 in contact with the upper channel 20, as can be seen in FIGS. 2 and 3. As shown in FIG. 2, the positioning tab 80 is normally located in the hole 34 to position the sleeve member 41 longitudinally in the interior space 38.

The latching mechanism 40 also includes a lock pin 84 formed with an annular flange 86 and a projection 88 at a top end and a conical tip 90 at a bottom end. As seen in FIG. 2, the portion of the lock pin 84 adjacent the flange 86 is supported within the locator hole 52 of the actuator member 50, and the shank portion of the lock pin 84 extends through the tubular portion of the sleeve member 41. As should be apparent, the tubular portion of the sleeve member 41 serves as a guide for assuring that the lock pin 84 moves along a vertical axis so as to position the conical tip 90 in one of the slots 18 in the lower channel 16 when the seat adjuster is in the latched position of FIG. 2. The lock pin 84 is held in the FIG. 2 latched position by having the annular flange 86 engaged by and biased downwardly by the spring clip 42 due to the top projection 88 of the pin 84 being located in the locator slot 44 of the spring clip 42. It will be noted that the lock pin 84 has minimal clearance with the inner surface of opening 74' in the tubular portion 74 of the sleeve member 41 so as to allow the lock pin 84 to slide up and down but not allow the lock pin 84 to move fore and aft relative to the opening 74'.

During operation of the vehicle, the seat assembly 10 is normally in a latched position as shown in FIG. 2. In the latched position, the spring clip 42 biases the flange 86 and accordingly the conical tip 90 of the lock pin 84 into one of the slots 18. To move the seat, an operator grasps the lift bar 62 and moves it upwardly to the unlatched position. The raising of the lift bar 62 causes the actuator member 50 to pivot upward about rivet 60 counteracting the biasing force of the spring clip 42 to withdraw the lock pin 84 from the slot 18 and permitting the latching mechanism 40 to assume the unlatched position so as to allow the seat to be adjustably moved to its next desired position. After the seat is moved to the desired position, the lift bar 62 is released, and it will fall to the latched position due to gravity. The lock pin will be biased by the spring clip 42 again and will tend to move downwardly towards a slot 18. The shape of the conical tip 90 tends to assist the lock pin 84 in entering a slot 18.

If for some reason the lock pin should be located on the surface of a webbing 19 upon release of the lift bar 62, a slight movement of the seat fore or aft will allow the lock pin 84 to fall into the first available slot 18. Thus, the latching mechanism 40 overcomes the problem of ratcheting, (a situation where the lock pin 84 will not properly engage the intended slot 18 but will skip past it and engage a different slot 18 or not engage any slot 18 at all), by allowing the lift bar 62 to fall to the latched position regardless of whether the lock pin 84 can enter a slot 18 or not. In other words, since the lift bar 62 can drop to the latched position, as explained above, even if the lock pin 84 is not in position to enter a slot 18 when the seat is moved to a desired location, the lock pin 84 will not have to overcome the inertia of the lift bar 62 in order to engage the slot 18. Also, since the lock pin 84 does not have the inertia of the lift bar 62 to retard its propensity to enter a slot 18, it will virtually always fall into the next available slot 18.

Each of the manual seat adjusters 12 and 14 include the sleeve member 41 which serves as a secondary locking means for adding strength to the seat adjuster so as to resist abnormally large forces applied to the seat adjuster in a horizontal direction when the seat belt assembly is attached to the upper channel 20. As aforementioned, the curved flanges 24 and 26 of the upper channel 20 interconnect with the projecting flanges 28 and 30 of the lower channel 16 to provide the necessary strength in a vertical direction and prevent the channels 16 and 20 from separating due to a vertical force from the seat belt assembly during sudden deceleration situations. The lock pin 84 of the latching mechanism 40 serves as a primary locking means and is more than strong enough to secure the seat in position horizontally during normal operating conditions. However, as is well known the seat can experience very large horizontal forces from the seat belt assembly when the vehicle decelerates rapidly from excessive speeds. So when a sudden deceleration of this type occurs, the lock pin 84, which during normal deceleration situations acts solely to maintain the seat in place, is provided with assistance from the sleeve member 41 to withstand the larger than normal horizontal loads placed upon it by the seat belt assembly.

In this regard and as mentioned above, the lock pin 84 has minimal clearance with the accommodating opening 74' in the sleeve portion 74 of the sleeve member 41. As a result, when the latching mechanism 40 is in the latched position of FIG. 2 and when an extremely large forwardly directed horizontal force acts upon the upper channel 20 of the seat adjuster 12, such force will cause the upper part of the lock pin 84 to tilt forwardly causing the sleeve member 41 to tilt along with it, as shown in FIG. 6. Since the flanges 82 of the tubular portion of the sleeve member 41 are peened over, as mentioned above, and therefore the upper part of the sleeve member 41 is fixedly mounted to the upper channel 20, the upper channel 20 will deform slightly to allow the sleeve member 41 to tilt to the position seen in FIG. 6. After the sleeve member 41 tilts due to the buckling of the upper channel 20, the lock tabs 76, 78 and 79 of the sleeve member 41 will move downwardly as seen in FIG. 6 into the slots 18a, 18b and 18c and engage sides of the webbing 19a, 19b and 19c causing the upper channel 20 to resist any further forward movement relative to the lower channel 16 and thereby arrest the horizontal motion of the seat relative to the vehicle.

Although the preferred embodiment of the present invention discloses the use of a vertical latching mechanism, it is not necessary that the latching mechanism 40 be latched in a vertical direction. The latching mechanism 40 could be latched in other directions as long as it allows for selective positioning of the upper channel 20 in relation to the lower channel 16 and includes a secondary locking means such as the sleeve member 41 so when the manual seat adjuster experiences a large horizontal force, the secondary locking means can supplement the primary latching means for securing the upper channel 20 in position relative to the lower channel 16.

I wish it to be understood that I do not desire to be limited to the exact details of construction shown and described inasmuch as obvious modifications will occur to a person skilled in the art.

The embodiments of the invention in which an exclusive property or privilege is claimed are defined as follows:

1. A manual seat adjuster for a vehicle seat which is adjustable fore and aft, the seat adjuster comprising:
   a lower channel fixedly mounted to a floor of the vehicle;
   an upper channel carried by the lower channel and interconnected with the lower channel;
   a latching mechanism mounted on the upper channel and having a primary locking means including a movable locking member adapted to assume a latched position for selectively positioning and locking the upper channel to the lower channel; and
   a secondary locking means operatively connected with said locking member of said primary locking means, said secondary locking means having a normal position in which it provides no locking function, but being movable from its normal position to a locking position in response to a rapid forward movement of the upper channel relative to the lower channel to additionally secure the upper channel to the lower channel when the seat encounters high load situations.

2. The manual seat adjuster as set forth in claim 1 wherein the lower channel and the upper channel define an interior space; and
   the secondary locking means is located inside of the interior space and slidably connected to said lower channel.

3. The manual seat adjuster as in claim 1 wherein the lower channel is formed with a plurality of slots;
   the latching mechanism comprising a spring clip fixedly attached to the upper channel;
   an actuator member pivotally attached to the spring clip;
   a lift bar attached to the actuator member;
   a lock pin operated by the actuator member and having a conical tip extending through the sleeve member into a slot in the lower channel for placing the seat adjuster in the latched position;
   the lock pin being biased into the slot by the spring clip; and
   said conical tip of the lock pin sliding upwardly against the lower channel in response to a rapid forward movement of the upper channel relative to the lower channel allowing said secondary locking means to engage.

4. A manual seat adjuster which is adjustable fore and aft for a vehicle, the seat adjuster comprising:
- a lower channel fixedly mounted to a floor of the vehicle;
- an upper channel carried by the lower channel and interconnected with the lower channel through a ball bearing assembly;
- the lower channel having a plurality of slots;
- the lower channel and the upper channel defining an interior space;
- a latching mechanism mounted on the upper channel to selectively position and lock the upper channel to the lower channel;
- the latching mechanism including a sleeve member and a spring clip fixedly attached to the upper channel;
- an actuator member pivotally attached to the spring clip;
- a lift bar attached to the actuator member;
- a lock pin operatively connected to the actuator member and extending through the upper channel and through the sleeve member into a slot in the lower channel for maintaining the seat adjuster in a latched position; and
- the lock pin being held in the slot by a lock pin holding means fitting against the actuator member and being biased in place by the spring clip;
- the lock pin and the sleeve member being responsive to forward movement of the upper channel relative to the lower channel for providing additional locking means when the latching mechanism is in the latched position.

5. The manual seat adjuster as in claim 4 wherein the slots are evenly longitudinally spaced.

6. The manual seat adjuster as in claim 4 wherein the slots are oblong.

7. The manual seat adjuster as in claim 4 wherein the lock pin holding means is an annular flange formed on the lock pin.

8. The manual seat adjuster as in claim 4 wherein the lock pin has a top projection;
- the spring clip having a locator slot; and
- the top projection of the lock pin being located in the locator slot of the spring clip.

9. The manual seat adjuster as in claim 4 wherein the sleeve member is located inside the interior space;
- the sleeve member having a tubular portion;
- the lock pin extending through the tubular portion; and
- the lock pin and the sleeve member tilting due to buckling of the upper channel and causing the sleeve member to engage the slots of the lower channel for securing the upper channel in position relative to the lower channel when the seat encounters high load situations.

10. The manual seat adjuster as in claim 9 wherein the upper channel is formed with a positioning hole;
- the sleeve member having a plurality of lock tabs at a forward end and a positioning tab at a rearward end;
- the positioning tabs being located in the positioning hole of the upper channel to longitudinally locate the locking device during normal operation of the seat adjuster; and
- the lock tabs engaging the slots of the lower channel for securing the upper channel to the lower channel when the sleeve member tilts due to buckling of the upper channel.

11. A manual seat adjuster which is adjustable fore and aft for a vehicle, the seat adjuster comprising:
- a lower channel fixedly mounted to a floor of the vehicle;
- an upper channel carried by the lower channel by a ball bearing assembly and interconnected with the lower channel;
- the lower channel having evenly longitudinally spaced oblong slots formed therein;
- the lower channel and the upper channel defining an interior space;
- a spring clip fixedly attached to the upper channel;
- an actuator member pivotally attached to the spring clip;
- a lift bar attached to the actuator member;
- a sleeve member located in the interior space;
- a lock pin being supported by the sleeve member and the actuator member and being biased toward the slots in the lower channel by the spring clip;
- the sleeve member having lock tabs at its forward end; and
- the sleeve member adapted to be moved by the lock pin to a position wherein the lock tabs engage the slots of the lower channel for securing the upper channel in position relative to the lower channel when the seat encounters high load situations.

12. The manual seat adjuster as in claim 11 wherein the manual seat adjuster is vertically latched.

13. The manual seat adjuster as in claim 12 wherein the lower channel defines evenly longitudinally spaced oblong slots along a bottom surface of the lower channel.

* * * * *